United States Patent
Kim et al.

[11] Patent Number: 5,819,001
[45] Date of Patent: Oct. 6, 1998

[54] ERROR CORRECTING METHOD FOR MULTISPEED PLAY OF DIGITAL VIDEO CASSETTE RECORDER

[75] Inventors: Sang Wu Kim; Seung Ho Kim, both of Taejon-si, Rep. of Korea

[73] Assignee: LG Electronics, Inc., Seoul, Rep. of Korea

[21] Appl. No.: 651,685

[22] Filed: May 21, 1996

[30] Foreign Application Priority Data

Nov. 21, 1995 [KR] Rep. of Korea ............... 42559/1995

[51] Int. Cl.$^6$ ............................ H04N 5/91; H04N 5/917
[52] U.S. Cl. .................................. 386/68; 386/109
[58] Field of Search ..................... 386/6, 7, 33, 67, 386/68, 109; 348/384, 390; 371/37.1, 60.1; 360/32; H04N 5/91, 5/917

[56] References Cited

U.S. PATENT DOCUMENTS 4,769,819  9/1988  Matsutani et al. .................. 371/38
5,587,803  12/1996 Inoue et al. .......................... 386/33

Primary Examiner—Robert Chevalier
Attorney, Agent, or Firm—John P. White

[57] ABSTRACT

Disclosed is an error correcting method for multispeed play which includes still, normal and high-speed play modes and is one of the most important functions of digital video cassette recorder (DVCR). A decoding method in normal play mode of DVCR comprises a first step of correcting errors with $(n_2-(n_a-k_a),k_2)$ RS code in each column vector, a second step of correcting or detecting errors with $(n_1,k_1)$ RS code in each row vector, and erasing the entire symbols of a row vector if an error pattern is detected in the corresponding row vector, and a third step of correcting the erasures generated by the row decoder in the second step with $(n_2,k_2)$ RS code in each column vector. The error correcting method enhances the error correcting capability in normal play mode as well as in high-speed play mode, and thus gives a lower symbol error rate than the conventional method does. It is shown that a significantly higher picture quality can be attained in normal play mode as well as in high-speed play mode.

2 Claims, 4 Drawing Sheets

ERROR CORRECTING METHOD FOR MULTISPEED PLAY OF DIGITAL VIDEO CASSETTE RECORDER

BACKGROUND OF THE INVENTION

1. Field of the Invention

The present invention relates to an error correcting method for multispeed play which includes still, normal and high-speed play modes and is one of the most important functions of digital video cassette recorder (DVCR). More particularly, this invention relates to an error correcting method for enhancing the error correcting capability in normal play mode as well as in high-speed play mode.

2. Description of the Prior Art

Error correcting codes have been widely used to correct errors occurring in data storage systems. The error correcting codes are classified as block codes and convolutional codes. In a DVCR, the block codes have been more widely used than the convolutional codes. In particular, the Reed-Solomon (RS) code has the largest error correcting capability for a given code length and redundancy, since it is a maximum distance separable (MDS) code.

Generally, two-dimensional RS codes are used in the DVCR in order to correct long burst errors. The two-dimensional RS codes comprise elementary row and column codes as illustrated in FIG. 1. The row code is $(n_1, k_1)$ RS code word and the column (outer) code is $(n_2, k_2)$ RS code word.

FIG. 2 illustrates a conventional encoding and decoding block diagram of the two-dimensional RS codes. The two-dimensional RS codes comprise a column encoder 1 for encoding input data Din in the vertical direction and storing the encoded data in a first memory 2, a row encoder 3 for encoding the data stored in the first memory 2 in the horizontal direction and recording the encoded data on a tape 4, a row decoder 5 for decoding data played back from the tape 4 in the horizontal direction and storing the decoded data in a second memory 6, and a column decoder 7 for decoding data stored in the second memory 6 in the vertical direction.

A conventional decoding in normal play mode is done in two steps as illustrated in FIG. 3. In a first step (row decoding), errors are corrected or detected by $(n_1, k_1)$ RS code. In general, $(n_1, k_1)$ RS code can correct $e_c$ errors or detect $e_d$ errors provided $e_c + e_d \leq n_1, k_1$, and $e_c < e_d$. If an error pattern is detected in a row vector, the entire symbols in the corresponding row vector are erased and a flag is set. After the row decoding is finished, each symbol in a column vector will be in one of the following states: corrected, erased, or in error. In a second step (column decoding), erasures are corrected by $(n_2, k_2)$ RS code using the (flag) information on the erasure locations provided by the row decoder. In general, $(n_2, k_2)$ RS code can correct $\tau$ erasures provided $\tau \leq n_2 - k_2$. If an error pattern is not detected in a row vector, or the number of erasures in a column vector exceeds the erasure correcting capability of $(n_2, k_2)$ RS code, the image quality may be seriously degraded.

In normal play, the head traces over a complete track and the data on each track are continuously reproduced as shown in FIG. 4. In high-speed play, however, the head traverses several tracks in one scan, and thus the amount of data read from each track is decreased as the play speed increases. In addition, the error rate in high-speed play is higher than that in normal play. Hence, the decoding in high-speed play mode is done by correcting errors in each row vector, because only a fraction of each column vector is filled with data. This is due to the reduced amount of data read from each track, and leads to a diminished picture quality in high-speed play mode.

SUMMARY OF THE INVENTION

An object of the present invention is to provide an error correcting method to improve the picture quality in high-speed play mode while keeping the picture quality in normal play mode unchanged (or improved).

In order to achieve the above object, the error correcting method in a digital video cassette recorder (DVCR) according to the present invention comprises the steps of performing $(n_1, k_1)$ Reed-Solomon (RS) encoding in each row vector and performing $(n_a, k_a)$ RS encoding for high-speed play mode and $(n_2(n_a - k_a), k_2)$ RS encoding for normal play mode in each column vector.

$(n - (n_a - k_a), k_2)$ code for (column) decoding in normal play mode and $(n_a, k_a)$ code in high-speed play mode are usually used during performing the decoding. Each row vector consists of $(n_1, k_1)$ RS code word.

The decoding in normal play mode is performed in three steps as illustrated in FIG. 7. In a first step (column decoding), errors in each column vector are corrected by $(n_2 - (n_a - k_a), k_2)$ RS code. In a second step (row decoding), errors in each row vector are corrected or detected by $(n_1, k_1)$ RS code. If an error pattern is detected in a row vector, the entire symbols in the corresponding row vector are erased. In a third step (column decoding), the erasures made by the row decoder in the second step are corrected by $(n_2 - (n_a - k_a), k_2)$ RS code.

In high-speed play mode, the decoding is performed in two steps as illustrated in FIG. 8. In a first step (row decoding), errors in each row vector are corrected or detected by $(n_1, k_1)$ RS code. If an error pattern is detected in a row vector, the entire symbols in the corresponding row vector are erased. In a second step (column decoding), the erasures made by the row decoder in the first step are corrected by $(n_a, k_a)$ RS code. The decoding in high-speed play mode is essentially identical to the second and third steps in normal play mode according to the present invention, except that the sub column $(n_a, k_a)$ code is used for erasure correction in each column vector.

BRIEF DESCRIPTION OF THE DRAWINGS

FIGS. 9A to 9F illustrate the results of computer simulation for comparing the present invention with the conventional method, wherein:

FIG. 9A is an original image;

FIG. 9B is an image mixed with error (the symbol error rate $p=10^{-2}$);

FIG. 9C is an image after correcting errors by the conventional method in normal play mode;

FIG. 9D is an image after correcting errors by the present invention in normal play mode;

FIG. 9E is an image after correcting errors by the conventional method in high-speed play mode; and FIG. 9F is an image after correcting errors by the present invention in high-speed play mode.

DETAILED DESCRIPTION OF THE INVENTION

Figure 1:
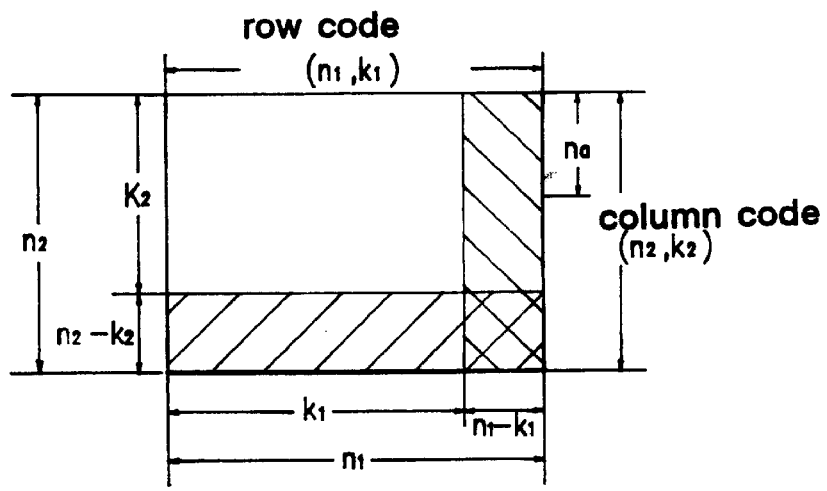
FIG. 1 illustrates a two-dimensional Reed Solomon product code of prior art.
Figure 2:
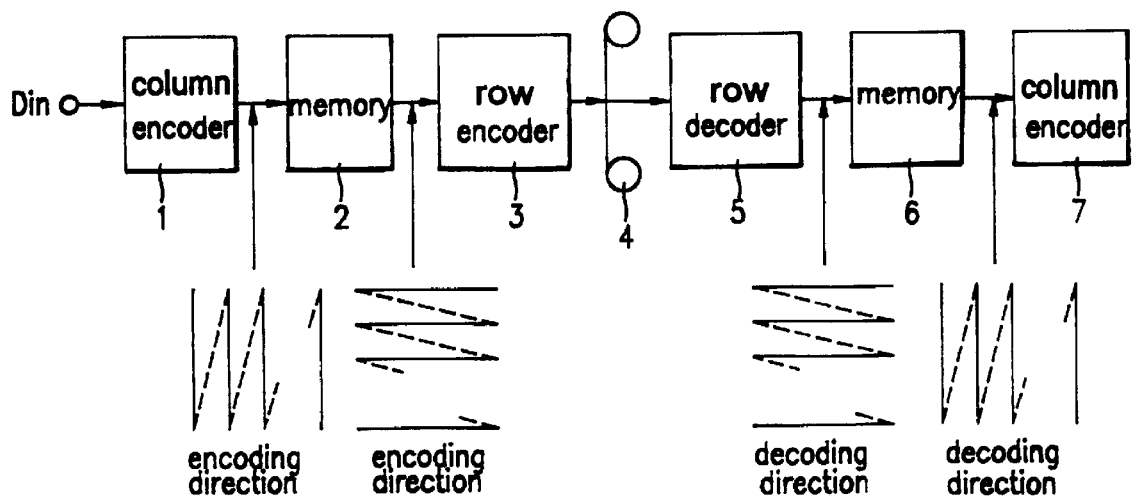
FIG. 2 illustrates an encoding and decoding block diagram of FIG. 1.
Figure 3:
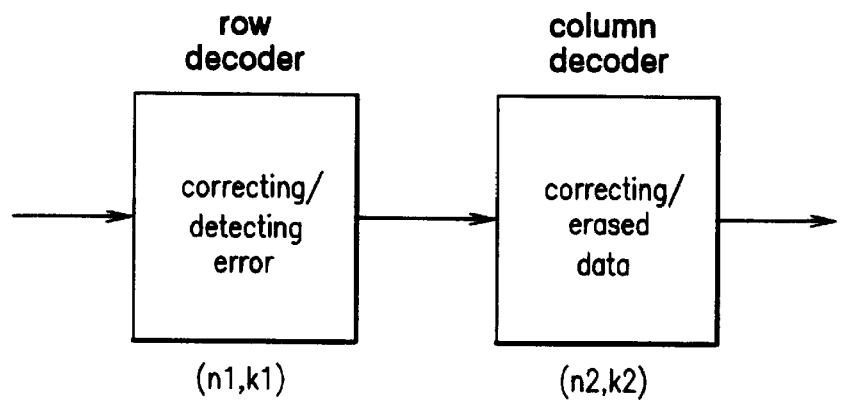
FIG. 3 illustrates a conventional decoding method in normal play mode.
Figure 4:
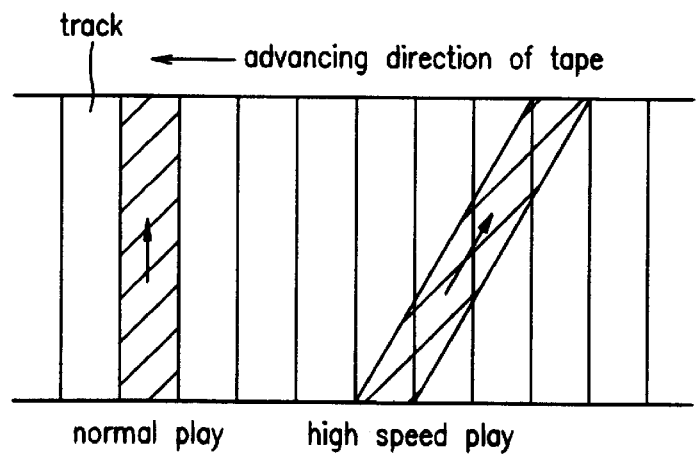
FIG. 4 illustrates the head trace on the magnetic tape.
Figure 5:
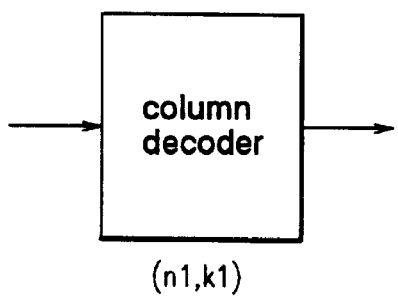
FIG. 5 illustrates a conventional decoding method in high-speed play mode.

In normal play mode, the data read in one track fills $n_1 \times n_2$ array, while in high-speed play mode the data read in one track fills $n_1 \times n_a$ partial array, where $n_1 < n_2$ (see FIG. 1). The length of the sub column code is determined by the amount of data read in one track. As the tape speed increases, the amount of data read in one track decreases and thus $n_a$ is decreased.

Figure 6:
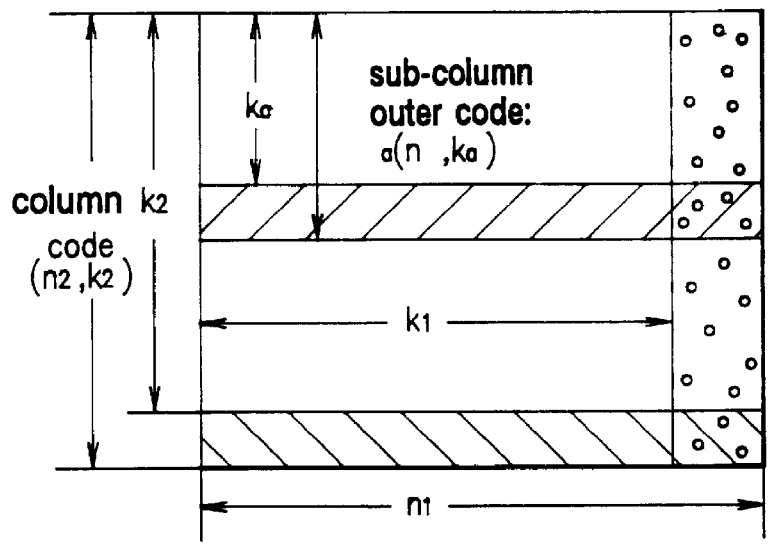
FIG. 6 illustrates the code structure of the present invention.

The code structure of the present invention is illustrated in FIG. 6. In each row vector, $k_1$ information symbols are encoded by $(n_1,k_1)$ RS code. In each column vector, the first $k_a$ information symbols in each column vector are encoded by $(n_a,k_a)$ RS code, and $k_2$ information symbols, including $k_a$=previously encoded symbols, are encoded by $(n_2-(n_a-k_a),k_2)$ RS code. $(n_2-(n_a-k_a),k_2)$ code for (column) decoding in normal play mode and $(n_a,k_a)$ code in high-speed play mode are usually used during performing the decoding.

Figure 7:
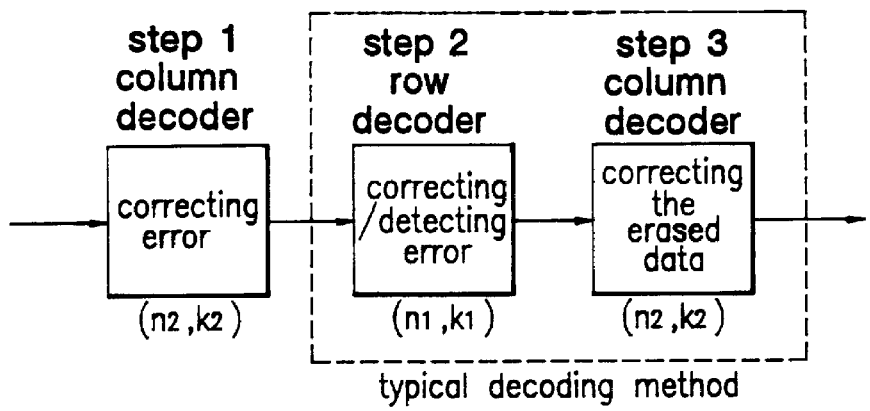
FIG. 7 illustrates the decoding method of the present invention in normal play mode.

In normal play mode, the decoding is divided into three steps as illustrated in FIG. 7. In a first step (column decoding), errors in each column vector are corrected by $(n_2(n_a-k_a),k_2)$ RS code. Since the minimum distance of $(n_2-(n_a-k_a),k_2)$ RS code is $n_2-(n_a-k_a)-k_2+1$, errors can be corrected up to $\lfloor (n_2-(n_a-k_a),k_2)/2 \rfloor$. In a second step (row decoding), errors in each row vector are corrected or detected by $(n_1,k_1)$ RS code. In general, $(n_1,k_1)$ RS code can correct $e_c$, errors or detect $e_d$ errors provided $E_c+e_d \leq n_1-k_1$, and $e_c \leq e_d$. If an error pattern is detected in a row vector, the entire symbols in the corresponding row vector are erased and a flag is set. In a third step (column decoding), erasures are corrected by $(n_2-(n_a-k_a),k_2)$ RS code using the (flag) information on the erasure locations provided by the row decoder in the second step. In this step, erasures in a column vector of length $n_2-(n_a-k_a)$ can be corrected up to $n_2-(n_a-k_a)-k_2$.

Figure 8:
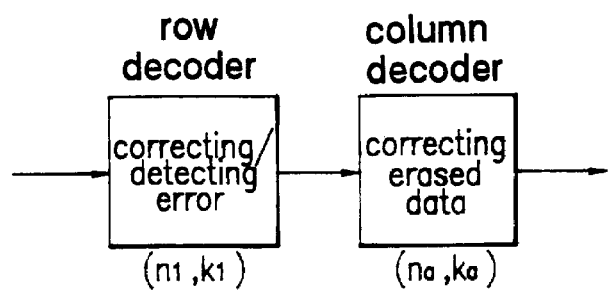
FIG. 8 illustrates the decoding method of the present invention in high-speed play mode.

In high-speed play mode, the decoding is performed in two steps as illustrated in FIG. 8. In a first step (row decoding), errors in each row vector are corrected and detected by $(n_1,k_1)$ RS code. If an error pattern is detected in a row vector, the entire symbols in the corresponding row vector are erased. In a second step (column decoding), the erasures made by the row decoder in the first step are corrected by $(n_a,k_a)$ RS code. In this step, erasures in a column vector of length $n_a$ can be corrected up to $(n_a-k_a)$.

In the following table, the probability of post decoding symbol error according to the present invention in normal and high-speed play (2 times fast play) modes is compared with that of the conventional method.

| Probability of channel symbol error p | normal play mode | | high speed play mode | |
|---|---|---|---|---|
| | conventional method | present invention | conventional method | present invention |
| (a) $e_c = 2, e_d = 6$ | | | | |
| 1.00e−5 | 5.70e−38 | 3.19e−103 | 9.87e−11 | 5.70e−38 |
| 1.00e−4 | 5.67e−31 | 2.99e−75 | 9.82e−08 | 5.67e−31 |
| 1.00e−3 | 5.42e−24 | 1.55e−47 | 9.29e−05 | 9.60e−18 |
| 1.00e−2 | 9.58e−03 | 4.45e−14 | 5.40e−02 | 1.94e−02 |
| (b) $e_c = 4, e_d = 4$ | | | | |
| 1.00e−5 | 1.30e−22 | 3.20e−69 | 3.28e−18 | 1.30e−22 |
| 1.00e−4 | 1.29e−17 | 3.05e−49 | 3.26e−13 | 1.29e−17 |
| 1.00e−3 | 1.22e−12 | 1.90e−29 | 3.07e−08 | 1.22e−12 |
| 1.00e−2 | 8.74e−08 | 1.81e−11 | 1.69e−03 | 7.89e−08 |

Present invention:
$n_1=85$, $k_1=77$, $n_a=74$, $k_a=69$, $n_2=149$, $k_2=138$, symbol size=256 (8bits)
Conventional method: $n_1=85$, $k_1=77$, $n_2=149$, $k_2=138$, symbol size=256 (8bits)

The length $n_a$ of the sub column code is determined by the amount of data read in one track (data of ½ track) in two times fast play mode.

The overall amount of redundancies in two methods are made the same for fair comparison. It is recognized that the error correcting method according to the present invention yields a significantly lower probability of symbol error than the conventional method does. This means that the error correcting method according to the present invention provides a significantly improved picture quality over the conventional method.

Figure 9A:
Figure 9B:
Figure 9C:
Figure 9D:
Figure 9E:
Figure 9F:

FIGS. 9A to 9F illustrate the results of computer simulation for comparing the present invention with the conventional method. The source coding consists of a discrete cosine transform (DCT) and an uniform quantization, where DCT is extensively used in most digital image compression algorithms: FIG. 9A is an original image. FIG. 9B is an image mixed with error (the symbol error rate $p=10^{-2}$). FIGS. 9C and 9D are images after correcting errors by the conventional decoding method and the decoding method according to the present invention in normal play mode, respectively. FIGS. 9E and 9F are images after correcting errors by the conventional method and the present invention in high-speed play mode, respectively.

As described above, the error correcting method of DVCR according to the present invention provides a significantly improved picture quality in normal as well as in high-speed play mode by reducing the probability of error after the decoding.

What is claimed is:

1. A method of correcting errors in a digital video cassette recorder (DVCR) comprising the steps of:

performing reed-solomon encoding of the codes $(n_1, k_1)$ in horizontal direction, wherein $n_1$, $k_1$ are integers denoting the row/column code length and information length respectively;

reed-solomon encoding of the codes $(n_a, k_a)$ for high speed play mode in vertical direction, wherein $n_a$, $k_a$ are integers denoting the column code length and information length respectively;

reed-solomon encoding of the codes $(n_2-(n_a-k_a), k_2)$ for normal play mode in the vertical direction; and recording data corresponding to $(n_1, k_1)$ $(n_2, k_2)$ and $(n_1, k_1)$ $(n_a, k_a)$ areas on a predetermined position of a tape.

2. The method of correcting errors in a DVCR as claimed in claim 1, further comprising the steps of detecting the data recorded on the tape in accordance with the predetermined high speed play mode and decoding data corresponding to $(n_1, k_1)$ $(n_a, k_a)$ area of the detected data.

* * * * *